United States Patent [19]

Carpenter et al.

[11] 4,301,907

[45] Nov. 24, 1981

[54] FRICTION CLUTCH DRIVEN PLATE

[75] Inventors: Ronald D. Carpenter, Lower Boddington; Philip A. Stone, Harbury, both of England

[73] Assignee: Automotive Products Limited, Leamington Spa, England

[21] Appl. No.: 14,998

[22] Filed: Feb. 26, 1979

[30] Foreign Application Priority Data

Feb. 28, 1978 [GB] United Kingdom ............... 7836/78

[51] Int. Cl.³ ................................... F16D 3/4
[52] U.S. Cl. ............................ 192/106.2; 64/27 C
[58] Field of Search ............... 192/55, 106.2, 106.1, 192/70.17, 70.16; 64/27 C

[56] References Cited

U.S. PATENT DOCUMENTS

| | | | |
|---|---|---|---|
| 3,428,155 | 2/1969 | Binder et al. | 192/106.2 X |
| 3,534,841 | 10/1970 | Schneider et al. | 192/106.2 |
| 4,139,995 | 2/1979 | Lamarche | 192/106.2 X |
| 4,177,888 | 12/1979 | Arrowsmith | 192/106.2 |

FOREIGN PATENT DOCUMENTS 1801969 11/1970 Fed. Rep. of Germany ... 192/106.2
2508878 10/1975 Fed. Rep. of Germany ... 192/106.2

Primary Examiner—Werner H. Schroeder
Assistant Examiner—Andrew M. Falik
Attorney, Agent, or Firm—Kemon & Estabrook

[57] ABSTRACT

This invention relates to friction clutch driven plates and in particular to motor vehicle clutch driven plates which require both an idling vibration damper and a load vibration damper. The driven plate comprises two concentric hubs, on one of which is mounted a friction facing carrier capable of restrained angular movement about the hubs. The hubs each have spring seatings which are arranged in a common radial plane and springs act between the seatings to oppose relative rotational movement between the hubs.

9 Claims, 9 Drawing Figures

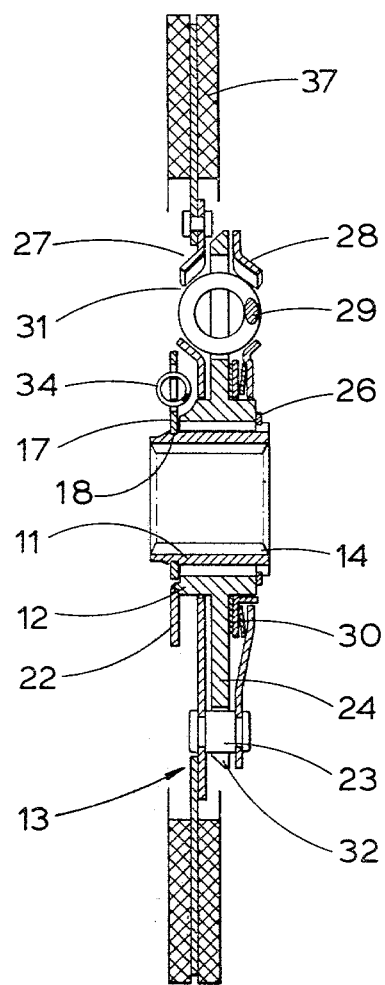
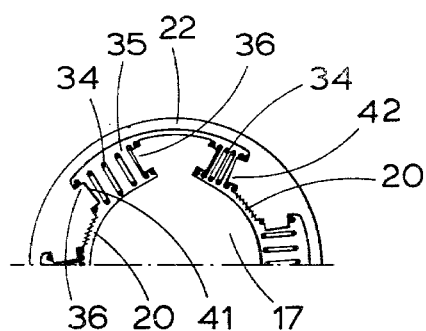
Fig.2
Fig.3

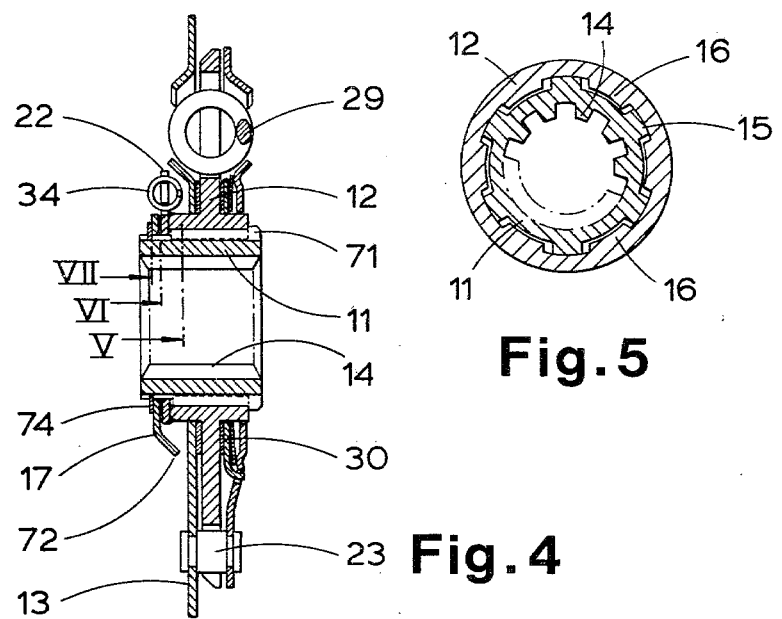
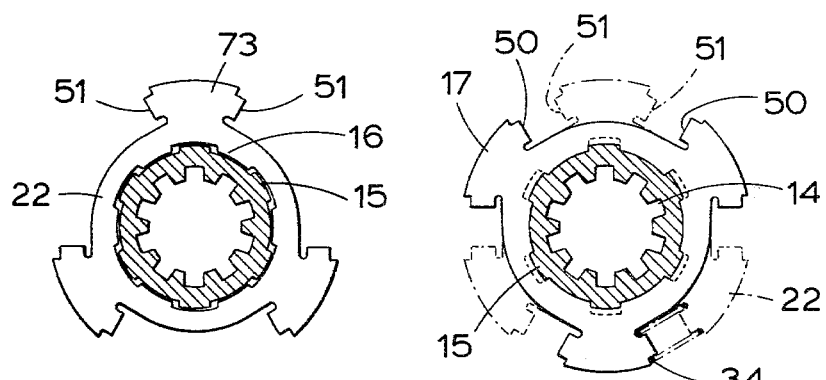
Fig. 4, Fig. 5, Fig. 6, Fig. 7

FRICTION CLUTCH DRIVEN PLATE

This invention relates to clutch driven plates for the friction clutches of automobiles.

Clutch driven plates which utilize two sets of damping means in the torque load transmission path through the driven plate are well known. Typically the driven plate will have a hub center, comprising concentric inner and outer hubs and a friction facing carrier. The two sets of springs are arranged to transmit torque from the friction facings to the inner hub and hence the gear box. Furthermore it is known to use a weaker set of springs as an initial damping means for the idling vibration damper and a stronger set of springs for the load vibration damper.

If the above construction is utilized with a lost motion connection between the inner and outer hubs, it is desirable when the torque loads are removed from the driven plate for the outer hub to be returned to a fixed zero position relative to the inner hub. This is in order that the build up of load in the two sets of springs, when measured against the deflection of the friction facings relative to the inner hub, is repeatable.

If the two sets of springs are arranged to act in series, that is the weaker set of springs between the inner and outer hubs and the stronger set between the outer hub and the facing carrier, then the displacement of facing carrier relative to the outer hub will not effect the positional relationship between the inner and outer hubs since this is determined by the loads in the weaker springs.

It is the object of the present invention to provide a simplified compact construction of a driven plate with idling and load vibration dampers acting in series.

According to this invention there is provided a friction clutch driven plate assembly having two concentric hubs, on one of which is mounted a friction facing carrier capable of limited restrained angular movement about the hubs, the hubs repectively having spring seatings arranged substantially in a common radial plane and springs acting between the spring seatings oppose relative rotational movement between the hubs.

Preferably the spring seatings are all in the form of abutment surfaces, which may all lie on a circle around the hub axis.

It is preferable for the abutments on the inner hub to be part of an outwardly projecting annular flange fast therewith and the abutments on the outer hub by an annular plate fast therewith.

The invention will be described by way of example and with reference to the accompanying drawings in which:

FIG. 2 is a section on the line II—II in FIG. 1;

FIG. 3 is a detail from FIG. 1 showing the first set of springs after 9° relative rotation between the first hub and the annular friction facing carrier;

FIG. 4 shows a section taken on the same line as II—II of a second embodiment of the invention;

FIG. 5 is a section on the line V—V of FIG. 4;

FIG. 6 is a section on the line VI—VI of FIG. 4; and

FIG. 7 is a section on the line VII—VII of FIG. 4, and also shows in the dotted outline the relative position of plate 22 illustrated in FIG. 6 and springs 34.

Figure 1:
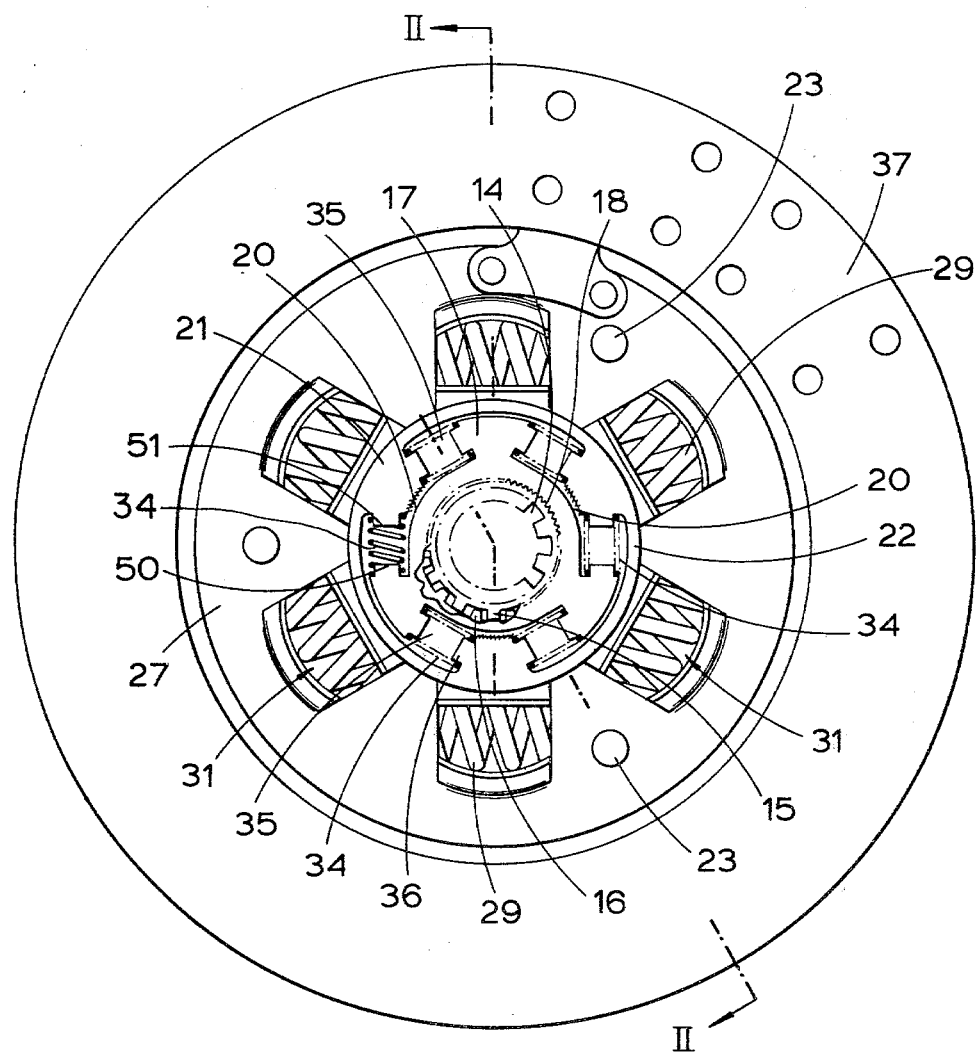
FIG. 1 is a view of a clutch driven plate according to this invention with a section of one component removed to reveal detail of the lost motion means.
Figure 8:
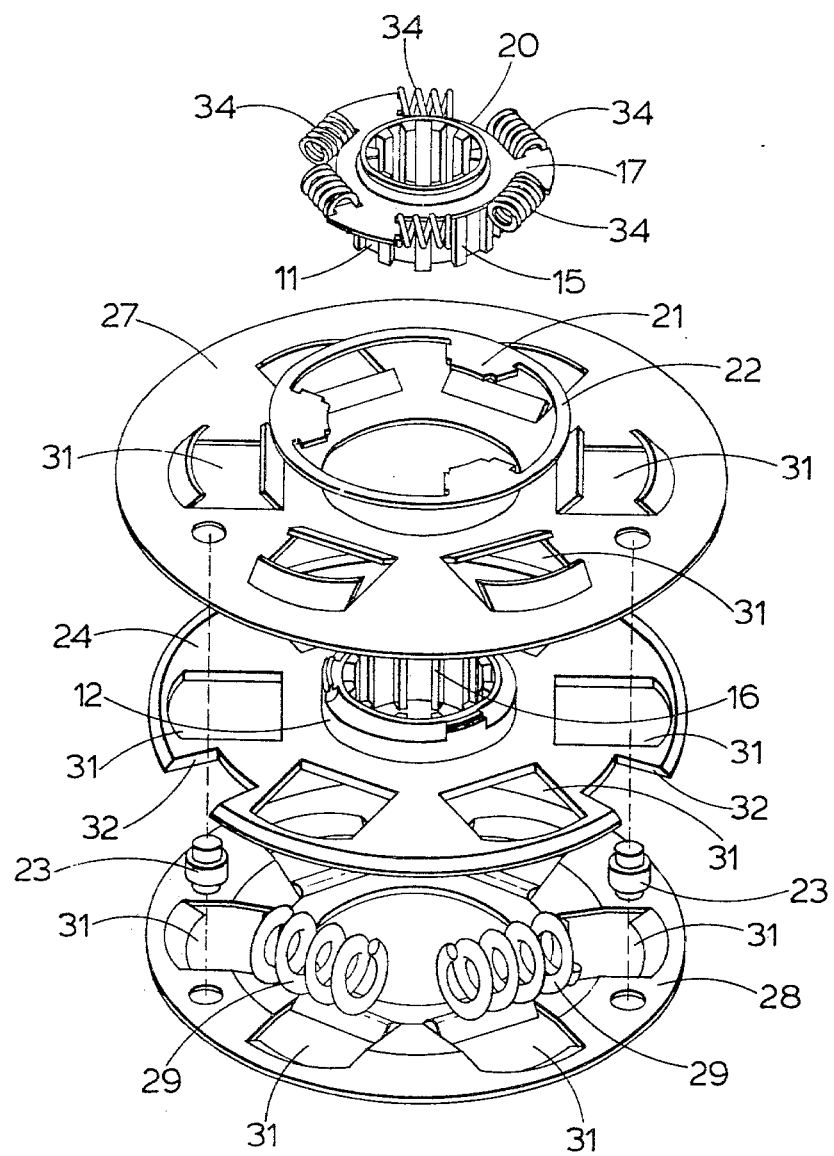
FIG. 8 is an exploded perspective view of the various elements shown in FIGS. 1 and 2.

With reference to FIGS. 1, 2 and 8 the clutch driven plate comprises three major concentric constituents, an inner hub 11, an outer hub 12 and an annular friction facing carrier 13.

The inner hub 11 is internally splined 14 for attachment to the input shaft of a gearbox (not shown) and has external splines 15 which are adapted to co-operate with the internal splines 16 of the concentric outer hub 12 so that there is a lost motion connection between the inner and outer hubs which allows the outer hub 12 limited angular rotation relative to the inner hub 11 before the splines 15 abut against the splines 16. The inner hub 11 has an outwardly projecting annular flange 17 which is secured thereto. The flange 17 is normal to the longitudinal axis of the hub 11 and is secured to one end portion thereof by being splined 18 thereon.

The radially outer periphery of the annular flange 17 has three equiangularly spaced circumferentially elongated slots 20 therein. These elongated slots 20 are circumferentially aligned with three radially inward projections 21 on the inner periphery of an annular plate 22 which is welded at the radially inner ends of the projection 21 to the outer hub 12. The annular plate 22 lies in the same plane as the annular flange 17 and each projection 21 is loosely accomodated within its corresponding slot 20 to form three very loose interengaging joints between the annular flange 17 and the annular plate 22 such that there is a large amount of circumferentially play between flange 17 and the plate 22. Thus there are six spaces 35, in total, between each of the three projections 21 and the sides of each of the corresponding slots 20 and a helical spring 34 is housed one in each of these spaces 35, so that each spring acts between opposed spring seatings which are constituted by abutments formed as edges 50 of the slots 20, and side faces 51 on the projections 21. The six springs 34 act in a peripheral direction and constitute a first resilient means which is more flexible than a second resilient means constituted by a second set of springs 29. The springs 34 are located against axial movement (that is axial relative to the hubs) by peripheral projections 36, one of which is located on each edge 50 and side face 51, so that a projection 36 extends into each end of a spring 34.

The outer hub 12 has an outwardly projecting hub flange 24 located at its approximate mid-length and which lies in a plane normal to the longitudinal axis of the hubs. The outer hub 12 being concentric with and movable relative to the inner hub 11 as previously described, is axially located on the inner hub 11 by the abutment of one end of the hub 12 against the flange 17 and at its other end the hub 12 is held in position by a circlip 26 on the inner hub 11.

The annular friction facing carrier 13 is formed from a carrier plate 27 and a retainer plate 28 which are arranged one on each side of the hub flange 24 and are secured together by the three stop pins 23. The facing carrier 13 so formed is capable of limited angular rotational movement relative to both the inner and outer hubs 11 and 12 respectively. The second resilient means, provided by the circumferentially arranged helical springs 29 housed in aligned apertures 31 in the hub flange 24 and the plates 27 and 28, acts between the outer hub 12 and the facing carrier 13 to oppose the relative angular rotation therebetween, the stop pins 23 co-operating with apertures 32 in the flange 24 to limit the degree of relative rotation.

Figure 9:
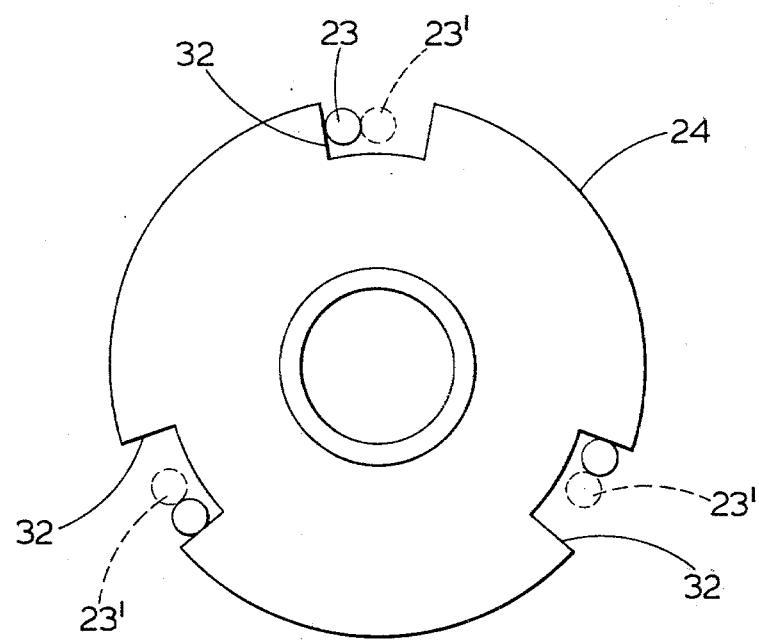
FIG. 9 shows the relative positions of the various members of FIGS. 1, 2 and 8 in the at rest position, shown in dotted lines, and at the maximum limit of relative rotation, shown in full lines.

When the torque load from the engine is applied via the flywheel and pressure plate to friction facings 37 secured to the carrier plate 27, the initial resistance to rotation of the facing carrier 13 relative to the inner hub 11 is provided by the weaker springs 34. The outer hub member 12 and the facing carrier 13 moving as a single unit the position of the stop pins 23 being located in the at rest position (shown as 231) in the center of the apertures 32 in the flange 24, as illustrated in FIG. 9, when the lost motion movement between the inner and outer hubs 11 and 12 respectively has been taken up, both hubs effectively become a single hub center. This is after 9° of movement and the springs 34 are as illustrated in FIG. 3. Further rotation of the facing carrier 13 relative to the inner hub 11 must overcome the load in the springs 34, the load in the stiffer springs 29, and any load exerted by a friction damper 30 operating between the facing carrier and the outer hub 12. This rotational movement will continue until the stop pins 23 abut the edge of the apertures 32 in the hub flange 24. This position is illustrated in FIG. 9 showing the stop pins 23 abutting the end of the aperture 32 in the flange 24, (the drawing in FIG. 9 is not to scale). The total rotational movement of the friction facing carrier 13 relative to the inner hub 11 being approximately ±13°.

When the driven plate is at maximum displacement and the rotation is reversed if the springs 29 are not prestressed when held in their apertures 31, then all the relative movement between friction facing carrier and the outer hub will not be reversed since some of the movement will be damped out by the friction damper 36. However, the second set of springs 34 acting between the inner and outer hubs will ensure that the first hub 11 is returned to a 0° deflection position relative to the second hub.

If all the six springs 34 have the same characteristics then taking FIG. 3 as an example, both springs 34 on the leading and trailing edges of the slot 20 have the same spring characteristics and the neutral position will be at the mid-point of the total movement i.e. 0° in this particular case with a total movement of ±13°. If however, the spring rates are arranged such that for any given pair of springs, the spring acting on the leading face 41 of the projection 21 is stiffer than the spring acting on the trailing face 42, then the neutral point can be shifted to be for example at −3° so that the total movement is −10°+16°.

Since the springs 34 operating on the leading and trailing faces 41 and 42, respectively of the projections 21 work as a pair and are precompressed, then movement of the projection 21 from the equilibrium position, where the load in both springs is the same, results in an increase in load in the spring on the leading face 41 and a decrease in load in the spring on the trailing face 42. For a pair of substantially equal springs this effectively gives the spring on the leading face 41 a spring rate which is twice that of the individual spring.

An alternative method of off-setting the neutral point is to offset the position of flange 17 with respect to the external splines 15 on the first hub member 11.

A second embodiment of the invention is shown in FIGS. 4, 5, 6 and 7 and shows a driven plate in which only the major differences from the first embodiment will be described and the components that are used in FIGS. 1 to 3 are given the reference number.

The inner hub 11 is arranged to have an integral outwardly projecting annular lip 71 at the one end thereof. The outer hub 12 axially abuts the lip 71 and the other ends of the inner and outer hubs, 11 and 12 respectively, carry the annular flange 17 and annular plate 22 respectively.

The annular flange 17 as before, is splined onto the inner hub 11 and has three equiangularly spaced circumferentially elongated slots 20 arranged around its inner periphery. The outer peripheral portion 72 of the flange 17 is inclined towards the hub flange 24 on the outer hub 17 so as to intersect the plane of the annular plate 22. The plate 22 is carried by the outer hub 12 so that it is adjacent the side of the flange 17 nearest the hub flange 24.

The annular plate 22 is attached to the outer hub by welding or by, for example pins, and is arranged to have three radially outward projections 73 which circumferentially align with the slots 20 in the intersecting inclined portion 72 of the flange such that as before each projection 73 is loosely accomodated in its slot 20.

As an alternative the flange 17 could remain flat and the outer peripheral portion of the plate 22 would be inclined to intersect with the flange 17.

The edges 50 of the slots 20 act as spring seatings and are located on the inclined portion 72 and the side faces 51 of the projections 73 also act as spring seatings such that springs 34 can act between opposed seatings on the flange 17 and plate 22.

The inner and outer hubs are held in axial alignment by a circlip 74 at the other end of the inner hub 11 so that the outer hub 12 is free to rotate between the circlip 74 and flange 71.

Thus the only major difference between the two embodiments is that the second embodiment instead of having the flange 17 and the annular plate 22, on which the spring seatings are provided, in the same plane, the plate 22 and flange 17 are axially offset relative to each other but a portion 72 of the flange 17 intersects the plate 22 so that the spring seatings are arranged substantially in the plane of the plate 22.

We claim:
1. A friction clutch driven plate having:
   an inner hub;
   a radially outwardly projecting peripheral flange fixedly attached to with said inner hub and located at one end portion thereof; and which has spring seatings thereon,
   an outer hub concentric with and capable of limited angular movement about said inner hub and having one end portion adjacent said flange;
   a co-axial annular plate fixedly attached to with said outer hub and located at the one end portion thereof and having spring seatings thereon that are arranged in substantially the same plane as said spring seatings on said flange;
   a friction facing carrier mounted on said outer hub and capable of restrained limited angular rotation about both said hubs, and springs acting between opposed spring seatings on said flange and said plate to oppose relative movement between said inner and outer hubs.

2. A friction clutch driven plate as claimed in claim 1, wherein there is a second set of springs located to restrain rotational movement between the facing carrier and the outer hub on which the carrier is mounted, and the second set of springs is located radially outside of the spring seatings and is a stiffer spring means than the springs acting between the spring seatings.

3. A friction clutch driven plate as claimed in claim 1, wherein the spring seatings all lie on a circle around the hub axis.

4. A friction clutch driven plate as claimed in claim 3, in which;
   the flange on the inner hub has slots defined in the outer peripheral margin thereof;
   the annular plate on the outer hub is axially offset from the flange and has radially outward projections on the outer periphery thereof that are circumferentially aligned with the slots;
   wherein the outer margin of one of the plate and flange is inclined in intersect with the other of the plate and flange such that projections are loosely interengagable with the slots to provide opposed co-planar spring seatings on the projections and edges of the corresponding slots.

5. A friction clutch driven plate as claimed in claim 1 or claim 4, wherein each spring, being a helical spring acting between a pair of spring seatings on a slot edge and its respective opposing side on a radial projection, is located and supported in position by aligned circumferential projections which jut into each end of the spring from each of the opposed edge and side, and the pair of circumferential projections have sufficient circumferential clearance therebetween to allow the springs to be fitted and also allow for the required relative rotational movement between the hubs.

6. A friction clutch driven plate as claimed in claim 5, wherein the springs are preloaded so that they are retained between their respective edge and side and also act to return the inner hub to a zero equilibrium position relative to the outer hub.

7. A friction clutch driven plate as claimed in claim 6, wherein each spring acting between the spring seatings has the same spring characteristics and is preloaded to the same extent.

8. A friction clutch driven plate as claimed in claim 3, in which;
   the flange on the inner hub has slots defined in the outer peripheral margin thereof;
   the annular plate on the outer hub is substantially co-planar with said flange and has radially inward projections on the inner periphery thereof that are circumferentially aligned with and are loosely interengagable with the slots so as to accomodate radial overlap between the flange and the plate;
   and wherein said overlap provides opposed co-planar spring seatings on the sides of the projections and the edges of corresponding slots.

9. A friction clutch driven plate as claimed in claim 4, wherein the annular plate is secured to the outer hub at the radially inner end portions of the inward projections.

* * * * *